US011510172B1

(12) United States Patent
Feng et al.

(10) Patent No.: US 11,510,172 B1
(45) Date of Patent: Nov. 22, 2022

(54) DEVICE DETECTION AND LOCATIONING WITHIN A WIRELESS NETWORK

(71) Applicant: Amazon Technologies, Inc., Seattle, WA (US)

(72) Inventors: Wei Feng, Sunnyvale, CA (US); Chunho Lee, Sunnyvale, CA (US); Haopeng Li, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/191,547

(22) Filed: Mar. 3, 2021

(51) Int. Cl.
*H04W 64/00* (2009.01)
*G01S 5/14* (2006.01)
*H04W 24/10* (2009.01)
*H04W 84/12* (2009.01)

(52) U.S. Cl.
CPC ............ *H04W 64/006* (2013.01); *G01S 5/14* (2013.01); *H04W 24/10* (2013.01); *H04W 84/12* (2013.01)

(58) Field of Classification Search
CPC . H04W 64/00; H04W 64/003; H04W 64/006; H04W 24/10; H04W 84/12; G01S 5/14
See application file for complete search history.

(56) References Cited

U.S. PATENT DOCUMENTS

| 10,674,331 | B1* | 6/2020 | Huang | H04W 4/023 |
| 2015/0181553 | A1* | 6/2015 | Segev | G01S 13/878 |
| | | | | 455/456.1 |
| 2015/0271776 | A1* | 9/2015 | Michaelovich | H04W 64/00 |
| | | | | 455/456.1 |
| 2016/0255471 | A1* | 9/2016 | Marri Sridhar | H04W 56/006 |
| | | | | 455/456.2 |
| 2017/0187830 | A1* | 6/2017 | Eyal | H04W 40/22 |
| 2018/0091286 | A1* | 3/2018 | Prechner | H04L 67/18 |
| 2020/0249311 | A1* | 8/2020 | Wirola | G01S 13/878 |
| 2022/0078644 | A1* | 3/2022 | Chennichetty | H04W 4/021 |
| 2022/0078727 | A1* | 3/2022 | Chennichetty | H04L 5/0055 |

* cited by examiner

*Primary Examiner* — Siu M Lee
(74) *Attorney, Agent, or Firm* — Lowenstein Sandler LLP

(57) ABSTRACT

Technologies directed to device detection and locationing are described. One method includes establishing a first wireless connection between a first wireless device and a second wireless device on a first channel. The first wireless device sends to the second wireless device a first indication that the first wireless device is to operate in an off-channel mode with a third wireless device at a first location a Fine Timing Measurement (FTM) procedure. The first wireless device performs a first FTM process between the first wireless device and the third wireless device. The first device determines first timing data including a signal round trip time (RRT) associated with the first FTM process and determines a first distance between the first wireless device and the third wireless device based on the first timing data. A second location of the first wireless device is determined using the first distance.

20 Claims, 11 Drawing Sheets

DEVICE DETECTION AND LOCATIONING WITHIN A WIRELESS NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these electronic devices include one or more antennas.

A wireless local area network (WLAN) may establish connections between multiple network devices. A network device may utilize the WLAN for accessing digital content stored on one or more digital content servers within or outside of the WLAN.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
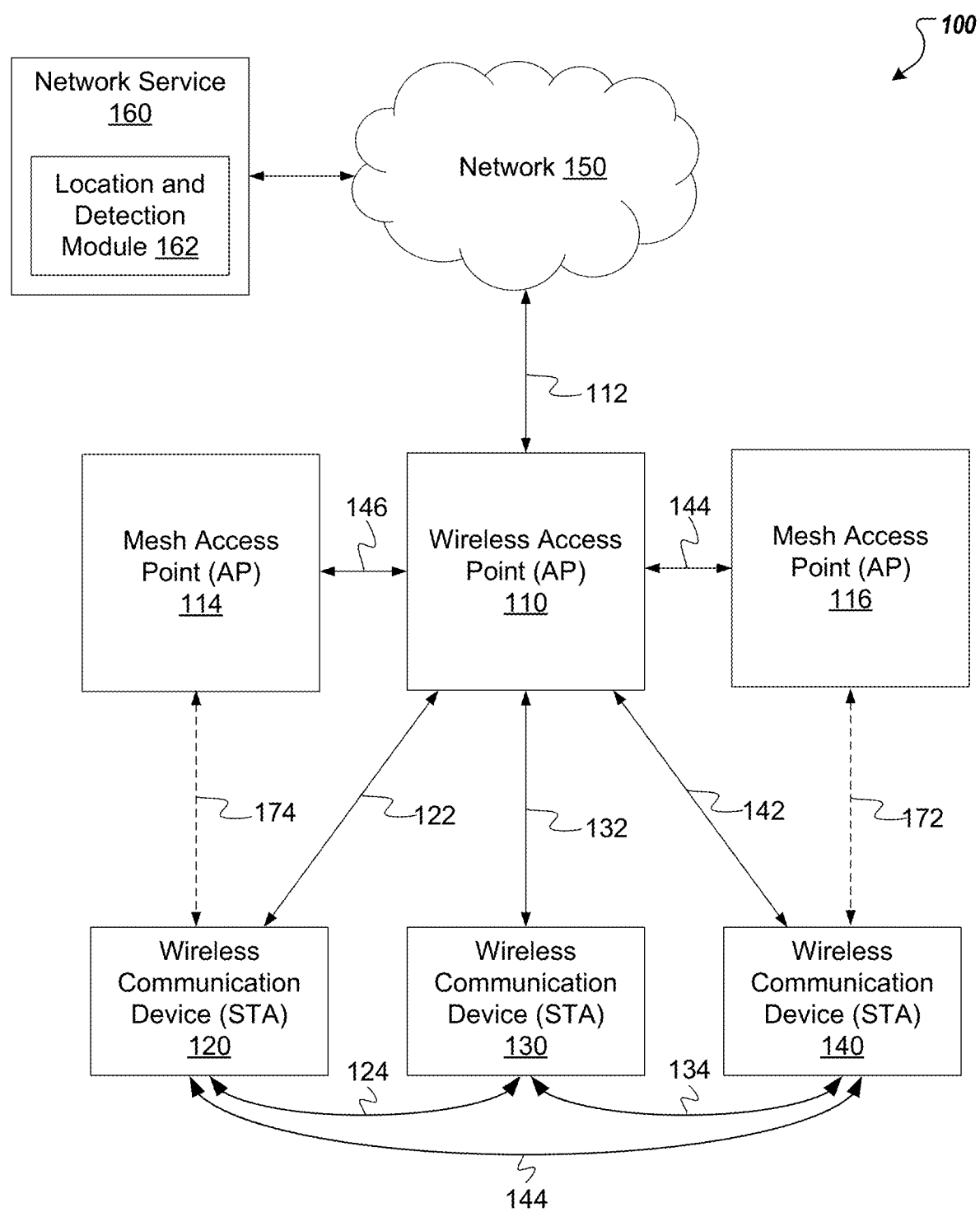
FIG. 1 is a block diagram illustrating an example configuration of a communication system, according to an embodiment.

Technology for indoor location estimation of a wireless communication device is described herein. The Institute of Electrical and Electronics Engineers (IEEE) 802.11 standard is commonly used to implement wireless local area network (WLAN) communication, (i.e., Wi-Fi). Newer versions of the 802.11 standard support the Fine Timing Measurement (FTM) protocol which can be used to determine distances between 802.11 enabled devices based on time-of-flight (TOF) measurements. Using FTM, a requesting device exchanges FTM frames with a responding device to measure the time-of-flight (TOF) or the Round Trip Delay (RTD/2). The requesting device can compute its distance from the responding device after receiving timing measurement values (i.e., timestamps corresponding to the departure time and arrival time of the FTM frames) from the responding device. Thus, if the requesting device is within range of multiple responding devices (e.g., three or more responding devices, such as wireless access points), the requesting device can perform an FTM frame exchange with each of the responding devices to determine a distance between the requesting device and each of the responding devices. The requesting device can then use trilateration to determine its location relative to those responding devices.

To keep track of smart devices for the wireless connection coverage and working status, it is helpful to map out the devices with their location within a network area (e.g., a dwelling, home, office, and/or other structure), with respect to the wireless coverage area. Similar locationing mechanisms can also be leveraged to detect intruding devices that potentially pose security risks to network data (e.g., home network data).

Traditional Wi-Fi positioning methods are based on received signal strength indication (RSSI) such as fingerprinting. For indoor and home (e.g., a dwelling) use, those methods are not effective since they often lack the necessary accuracy and/or require regular manual configuration. Compared to RSSI positioning methods, the IEEE 802.11mc-2016 Fine Timing Measurement (FTM) enables devices to acquire distances and/or location information by precisely measuring Round Trip Time (RTT) of wireless signals between devices. In some cases, up to a one-meter position accuracy can be achieved with FTM in ideal environments.

Aspects of the present disclosure address the above and other deficiencies of device detection and locationing by enabling FTM processes to detect and locate devices within a wireless network (e.g., a home wireless network). For example, a system may include three access point (AP) devices (e.g., mesh points, an amazon EERO device) with FTM support (e.g., devices that support 802.11mc). In another example, three network devices that do not natively support FTM procedures may be used. In this example, the 802.11mc feature may be added through a software access point (SoftAP) mode and/or Target Wake Time (TWT). In another example, combinations of AP devices and non-natively supported FTM devices may be used together. Multiple devices (e.g., three or more) can be used to locate other devices associated with the wireless network (e.g., devices entering a reference boundary or reference region). These device combinations (e.g., combinations of anchoring devices) can be configured to activate a location probing mode on a pre-configured schedule. In some embodiments, an anchoring process may be used to register the locations of the probing devices to calibrate the system for device detection and locationing in a defined reference frame (e.g., on a coordinate plane representative of the network and/or boundary of a dwelling).

In at least one embodiment, FTM processing techniques may be used by a system of devices for wireless coverage analysis, rogue device detection, and/or device location tracking, among other things. The system may include an anchoring process that maps out the device locations within a network (e.g., a home). The process identifies and registers the location of multiple anchoring devices (e.g., wireless devices that often persist in the same location such as TV, smart devices, AP devices, mesh points, etc.) and uses these location combined with multiple distance measurements to determine where devices are located in association with the anchoring devices and/or within a reference frame (e.g., a boundary of a structure such as a home and/or office building) associated with the wireless network. Various data, in addition to location data, can be obtained such as signal strength and device usage data to determine data patterns (e.g., an abnormal data flow or signal strength with a known device), device familiarity (e.g., is the device a rogue device), and/or network coverage (e.g., identifying a region of the network that are below are threshold signal strength).

In one embodiment, a first wireless device includes a first wireless local area network (WLAN) radio. The first wireless device is a part of a WLAN. The first wireless device further includes a processor coupled to the first WLAN radio. The processor may perform the following actions. The processor establishes a first wireless connection with a second wireless device using the first WLAN radio. The second wireless device may operate as a first access point (AP) that provides internet access to the first wireless device on a first channel in the WLAN. After the first wireless connection is established the processor sends first data to the second wireless device. The first data indicates that the first wireless device is operating in an off-channel mode with a neighboring wireless device using a Fine Timing Measurement (FTM) protocol. The processor further sends, to the neighboring wireless device in a second channel in the off-channel mode, a first request. The second channel is different than the first channel. The first request causes the neighboring wireless device to perform an FTM process. The processor further receives, from the neighboring wireless device in the second channel, a second request including a first timestamp indicative of a first departure time of the second request from the neighboring wireless device. The processor further sends, to the neighboring wireless device in the second channel, a first acknowledgment associated with the second request. The first acknowledgment includes a second timestamp indicative of a first arrival time of the second request by the first wireless device and a third timestamp indicative of a second departure time of the first acknowledgment from the first wireless device. The processor further receives, from the neighboring wireless device in the second channel, a second acknowledgment that includes a fourth timestamp indicative of a second arrival time of the second acknowledgment by the neighboring wireless device. The processor further sends, to the second wireless device in the first channel, second data that indicates that the first wireless device is to operate on the first channel. The processor further determines a first distance between the first wireless device and the neighboring wireless device based on the first timestamp, the second timestamp, the third timestamp, and the fourth timestamp.

It should be noted that although various embodiments described herein are directed to AP devices, in other embodiments, a wireless device can be a mesh station (STA), a wireless device capable of operating in a SoftAP mode, and/or another wireless device in which one or more devices are connected to it wirelessly for access and the other can communicate with another device for access or backhaul connectivity.

FIG. 1 is a block diagram illustrating an example configuration of a communication system 100, according to an embodiment. Within the communication system 100, a carrier-based network such as an IEEE 802.11 compatible wireless access point is established by network equipment. The network equipment may include a wireless access point, a Wi-Fi hotspot, or other similar device communicating with mesh access points 114, 116, and wireless communication devices 120, 130, and 140. Each of wireless communication devices 120, 130, and 140 may also be referred to as a user equipment (UE) or a communication station (STA). The carrier-based network includes wireless network connections 122, 132, and 142 between the network equipment and the wireless communication devices 120, 130, and 140, respectively, and wireless network connections 124, 134, and 144 between the wireless communication devices 120, 130, and 140, directly. Alternatively or additionally, the wireless access point 110 communicates to wireless communication devices 120, 130, and 140, by connecting to mesh access points 114, 116 through connections 146, 144 and the mesh access points connecting to any of wireless communication devices 120, 130, and 140 (e.g., connections 174 and 172). Depending on the embodiment, the wireless communication devices 120, 130, and 140 may include, for example, a smartphone, a mobile phone handset, a personal computer having an integrated or external wireless network communication device, a smart speaker, a tablet computer, a smart television, or any other network-connected device.

The network equipment is illustrated in FIG. 1 as being connected via a network connection 112 to a communications network 150. The communications network 150 may provide access to any number of network resources that operate to provide various types of information to, or receive information from, wireless communication devices 120, 130, and 140, including device location information, user profiles, user information, web sites, e-mail, and the like. For example, a network service 160 (e.g., a cloud service) may run on a server or other set of one or more computing devices connected to network 150. Network service 160 may include location and detection module 162 that enables the determination of the location of the various wireless communication devices 120, 130, and 140, with respect to each other and/or with respect to the network equipment.

Wireless communication devices 120, 130, and 140 may communicate with the network equipment when in range or otherwise in proximity for wireless communications. As illustrated, connection 122 may be established between the wireless communication device 120 and the network equipment, connection 132 may be established between the wireless communication device 130 and the network equipment, and connection 142 may be established between the wireless communication device 140 and the network equipment. Additionally, wireless communications devices 120, 130, and 140 may connect with mesh access points 114, 116 to communicate to wireless access point 110 indirectly. In addition, wireless communication devices 120, 130, and 140 may communicate directly with each other when in range or otherwise in proximity for wireless communications. As illustrated, the connection 124 may be established between the wireless communication device 120 and the wireless communication device 130; the connection 134 may be established between the wireless communication device 130 and the wireless communication device 140; and the connection 144 may be established between the wireless communication device 120 and the wireless communication device 140.

In one embodiment, the wireless connections 122, 132, and 142 between devices 120, 130, and, 140 and the network equipment may utilize a Wi-Fi or IEEE 802.11 standard protocol. In other embodiments, the wireless connections 122, 132, 142, 144, 146, 174, 172 may use some other wireless protocol, such as the current 3rd Generation Partnership Project (3GPP) long term evolution (LTE), or time division duplex (TDD)-Advanced systems. The wireless communication devices 120, 130, and, 140 may each include one or more antennas, receivers, transmitters, or transceivers that are configured to utilize a Wi-Fi or IEEE 802.11 standard protocol or a protocol such as 3GPP LTE, or TDD-Advanced, or any combination of these or other communications standards. In one embodiment, the wireless connections 124, 134, and 144 between devices 120, 130, and, 140 may utilize the same Wi-Fi or IEEE 802.11 standard protocol or other protocols such as Bluetooth®, ZigBee, near field communications (NFC), or other protocol that supports the time of flight measurements and/or the FTM feature.

The antennas in or on devices 120, 130, and, 140 may comprise one or more directional or omnidirectional antennas, including, for example, dipole antennas, monopole antennas, patch antennas, loop antennas, microstrip antennas, or other types of antennas suitable for transmission of radio frequency (RF) signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to utilize spatial diversity and the different channel characteristics that may result between each of the antennas and the antennas of a transmitting station. In some MIMO embodiments, antennas may be separated by up to $1/10$ of a wavelength or more.

Network equipment 110 may provide wireless communication services to wireless communication devices 120, 130, and 140. While the exemplary communication system 100 of FIG. 1 depicts only three wireless communication devices 120, 130, and 140, in other embodiments, any combination of multiple users, devices, servers and the like may be coupled to network equipment. For example, one or more users that are located in a venue, such as a building, house, or other areas, may utilize any number of wireless-enabled computing devices to independently communicate with network equipment. Similarly, communication system 100 may include more than one network equipment. For example, a plurality of access points (e.g., mesh access points 114 and 116) or base stations may form an overlapping coverage area where wireless communication devices may communicate with at least two instances of network equipment.

Although communication system 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

Figure 2A:
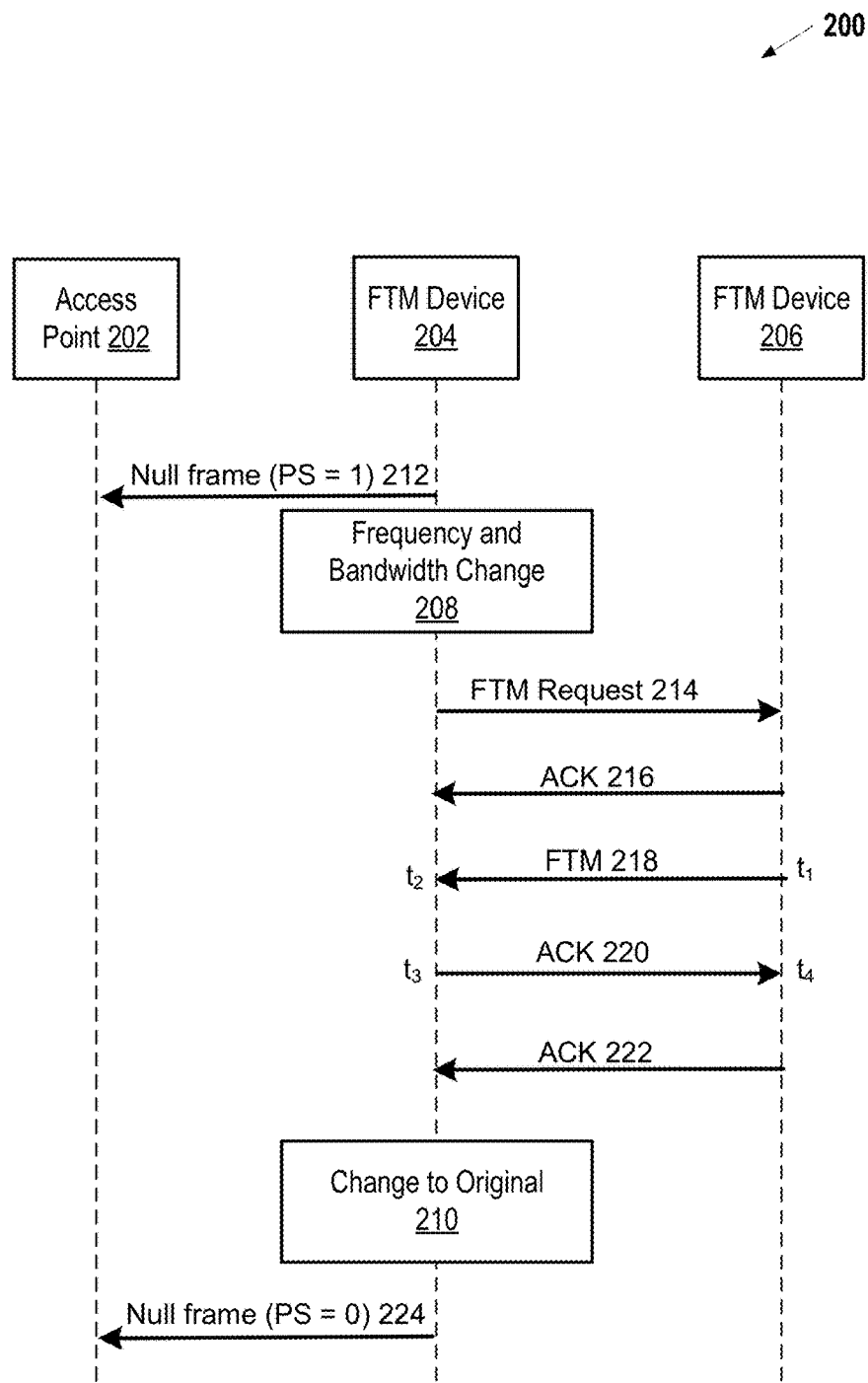
FIGS. 2A-B depicts various Fine Timing Measurement (FTM) procedures, according to some embodiments.
Figure 2B:
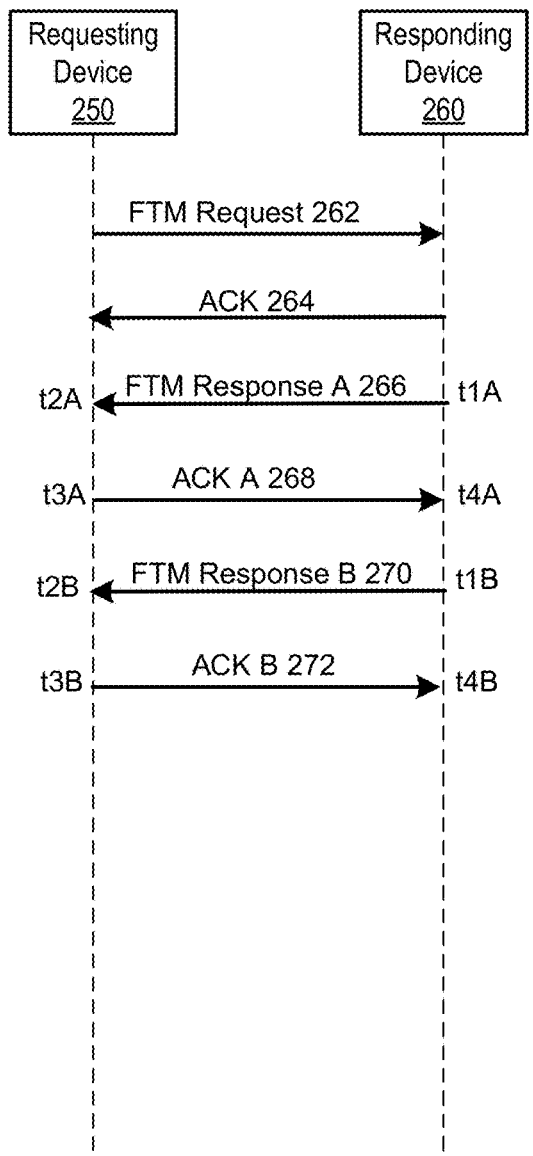

FIGS. 2A-B depicts various Fine Timing Measurement (FTM) procedures, according to some embodiments. FIG. 2A is a diagram illustrating an off-channel Fine Timing Measurement (FTM) process 200, according to one embodiment. The off-channel FTM process may be performed among multiple FTM devices (e.g., wireless devices 120, 130, 140 such as a router, computer, a smartphone, a voice-controlled device, a wireless display, wireless speaker, a game console, a wireless gamepad, or the like). The FTM process 200 may be performed in a channel different than a channel operated on by the AP (e.g., a channel proficient in handling FTM requests such as a wide bandwidth 5 GHz channel). FIG. 2A illustrates an exemplary embodiment of performing the FTM process between a first FTM device 204 and a second FTM device 206 both operating on a network provided by access point (AP) 202. It should be noted that the procedure may be used between multiple devices beyond what is described herein. For example, as discussed further in other embodiments, the FTM process may be performed between a first wireless device and an AP, between two AP devices, between multiple endpoint devices, between an endpoint device and an AP, and so on.

As shown in FIG. 2A, the FTM process includes sending first data 212 from the first FTM device 204 to the AP 202. The first data may include a frame indicative of a change in operation mode (e.g., offline mode, power save mode, Target Wake Time (TWT) mode, etc.) by the first FTM device 204. At block 208, the first FTM device changes operation modes to perform in the off-channel operational mode. This can include disconnecting from the AP, performing in a software-enabled access point (SoftAP) mode, and/or altering the channel and bandwidth the first FTM device 204 is to operate. For example, in SoftAP the first device FTM (which may not have been specifically made to be a router) is converted into a wireless access point.

As shown in FIG. 2A, the FTM process includes performing data transfer between the FTM devices 204, 206 (e.g., an FTM handshake) by sending, by the first FTM device 204 to the second FTM device 206, an FTM request 214 and receiving, by the first FTM device 204 from the second FTM device, an acknowledgment 216 associated with the FTM request 214. The FTM process proceeds with the second FTM sending an FTM request 218 to the first FTM device. The FTM request 218 may include a first timestamp $t_1$ associated with a departure time of the FTM request 218 from the second FTM device 206. The first FTM device 204 sends, to the second FTM device 206, an acknowledgment 220.

Acknowledgment 220 may include a second $t_2$ timestamp and a third $t_3$ timestamp. The second $t_2$ timestamp may be indicative of a first arrival time of the FTM request 218 by the first FTM device 204. The third $t_3$ timestamp may be indicative of a departure time of acknowledgment 220 from the first FTM device 204. The first FTM device 204 receives from the second FTM device 206 an acknowledgment 222. The acknowledgment 222 may include a fourth $t_4$ timestamp indicative of a departure time of the acknowledgment 222.

As shown in FIG. 2A, the first FTM 204 device returns to normal operating mode, operating on a first channel that is associated with the AP 202. The first FTM device 204 notifies the AP 202 that the first FTM device 204 has returned to the first channel in the original operating mode.

The timing data received (e.g., $t_1$, $t_2$, $t_3$, and $t_4$) from performing the FTM procedure 200A may then be used to determine a distance between the first FTM device 204 and the second FTM device. For example, a round trip time (RTT) can be determined by calculating a total process time and subtracting the process wait time. The total process time can be calculated by subtracting a value associated with the fourth timestamp $t_4$ and the first timestamp $t_1$. The process wait time can be calculated by subtracting the third timestamp $t_3$ and the second timestamp $t_2$. The wait time is removed from the total time to obtain the total traveling time of the round trip signal from the second FTM device 206 to the first FTM device 204 and then back to the second FTM device 206. This time duration can then be used to determine a distance based on the calculated round trip time. In some embodiments, the FTM procedure uses multiple FTM requests (e.g., to determine an average round trip time) to determine an average distance over many measurements.

In some embodiments the FTM devices 204, 206 operate on an FTM schedule. The FTM schedule is shared between the FTM devices. The FTM devices notify the AP 202 which devices belong to an FTM process and will be off-channel for a duration of the FTM process. The off-channel notification can leverage power saving mechanisms such as Legacy Power-Save, WMM-PS, and/or Target Wake Time (TWT)

As noted previously, the FTM process may be performed by multiple devices operating in a wireless network. The FTM process shown in FIG. 1 can be used to determine distances between many different neighboring wireless devices (e.g., AP devices, endpoint devices, mesh points, etc.) in an off-channel operational mode. For example, in some embodiments, one of the first FTM device 204 or the second FTM device 206 is also the AP 202.

FIG. 2B is a sequence diagram illustrating a generalized fine timing measurement (FTM) frame exchange procedure 200, according to an embodiment. The FTM procedure 200B allows requesting wireless device 250 to accurately measure the Round Trip Time (RTT) between it and responding wireless device 260 (e.g., a station, access point, etc.). Requesting wireless device 250 and responding wireless device 260 may represent any one of wireless communication devices 120, 130, and 140 illustrated in FIG. 1. In one embodiment, the requesting device 250 transmits an FTM request 262 to a responding wireless communication device, such as responding wireless device 260. The responding wireless device 260 then generates and transmits an acknowledgment (e.g., ACK 264) to the FTM request frame 262 to the requesting wireless device 250.

In time, responding wireless device 260 will generate and send an FTM response to requesting wireless device 250, which may be referred to as an "FTM response" or generally as a "response" or a "response to the FTM request frame." The response to the FTM request frame 262 may be generated and transmitted using any of a number of different means. In one example, the response to the FTM request frame 262 may be piggybacked within an FTM frame. In another example, the response to the FTM request frame 262 may be included within a block acknowledgment (BACK) frame. In yet another example, the response to the FTM request frame 262 may be an FTM acknowledgment (ACK) frame. In another example, the response to the FTM request frame 262 may be piggybacked onto or included within any other frame (e.g., besides an FTM frame) transmitted from the responding wireless device 260 to the other requesting wireless device 250 via the communication interface. Any desired form of response may be used to generate and transmit the response to the FTM request frame 262 to the requesting wireless device 250.

The requesting wireless device 250 and the responding wireless device 260 may then make various subsequent frame exchanges (e.g., FTM frames) including FTM Response A 266 and FTM Response B 270, and replies to the FTM frames/acknowledgments (ACKs) ACK A 268 and ACK B 272. The responding wireless device 260 transmits the FTM Response A frame 266 after transmitting ACK 264 to the requesting wireless device 250 in response to the FTM request 262 received from the requesting wireless device 250. The time t1A corresponds to the transmission time of the FTM Response A frame 266 sent by the responding wireless device 260, the time t2A corresponds to the reception time of the FTM Response A frame 266 captured by the requesting wireless device 250, the time t3A corresponds to the transmission time of the ACK A frame 268 in response to the FTM Response A frame 266 sent by the requesting wireless device 250, and t4A corresponds to the reception time of the ACK A frame 268 that is in response to the FTM Response A frame 266 captured by the responding wireless device 260.

The responding wireless device 260 provides additional FTM response frames (e.g., FTM Response B 270 at time t2B) to the requesting wireless device 250 that indicate additional respective transmission times and reception times of the previous FTM Response A frame 266 and the ACK A frame 268. For example, FTM Response B 270 frame may include an indication in its payload of time t2A indicating the time at which FTM Response A frame 266 was sent and time t4A indicating the time at which ACK A frame 268 was received. The requesting wireless device 250 receives FTM Response B 270 at time t2B transmits additional ACKs (e.g., ACK B 272) at time t3B (received at time t4B) in response to these additional received FTM frames and captures additional respective reception times of the corresponding FTM frames and transmission times of the corresponding ACKs.

Note that alternative implementations of this FTM frame exchange may be performed that includes transmitting modified beacons, other signals, or other types of frames that include FTM related information and/or timestamps related information, and responses to such modified beacons, other signals, or other types of frames may also have various forms (e.g., acknowledgment (ACK), null data packet (NDP), other signals, or other types of frames). Furthermore, although only two sets of FTM responses and acknowledgments are illustrated in FIG. 2B, in other implementations, any number of additional frame exchanges may be performed by requesting device 250 and responding device 260.

Upon receiving one or more responses, such as FTM Response A 266 and FTM Response B 270 to the FTM request 262, requesting wireless device 250 can either calculate the time of flight (TOF) or round-trip delay (RTD/2) or forward the timing information to a cloud service, such as network service including station position module, for the calculations to be performed. In either case, the time of flight between requesting wireless station 210 and responding wireless device 260 can be determined as illustrated in Equation 1.

$$TOF = \frac{[(t4A - t1A) - (t3A - t2A)]}{2} \qquad (1)$$

As illustrated, the time of flight is equal to half of the difference between the time t4A when ACK A frame 268 was received by responding wireless device 260 and the time t1A when FTM Response A 266 was sent by responding wireless device 260 minus the amount of time it took for the requesting station to receive FTM Response A frame 266 and send ACK A frame 268 (i.e., t3A-t2A). A corresponding range or distance between requesting wireless device 250 and responding wireless device 260 can be determined using the calculated time of flight multiplied by the speed of light (e.g., approximately 300,000 kilometers per second). Additional time of flight calculations may be determined using subsequent frame exchange times (e.g., t1B, t2B, t3B, t4B associated with FTM Response B 270 frame and ACK B frame 272) and an updated range between requesting wireless device 250 and responding wireless device 260 can be determined.

Requesting wireless device 250 can perform the above described FTM frame exchange procedure with any number of other responding wireless stations, such as others of wireless communication devices 120, 130, and 140, and can determine a corresponding range to each of those other responding wireless stations. Once having determined the range to at least three other responding wireless stations, requesting wireless station 210, or network service running device location and detection module 162, can positioning techniques, as will be described further in other embodiments, to determine a position of the requesting wireless device 250 relative to the other responding wireless device. If the absolute position of the responding wireless devices is known (e.g., latitude/longitude, global positioning system (GPS) coordinates), then the absolute position of requesting wireless device 250 can be determined using the relative position.

Figure 3A:
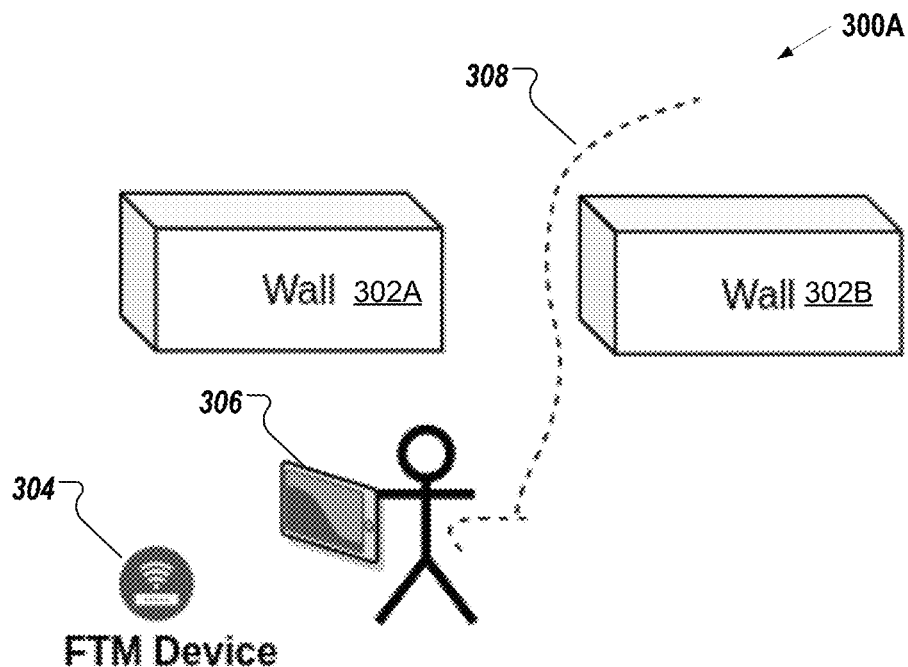
FIG. 3A-B illustrates exemplary obstruction detection and correction of signals between wireless devices, according to one embodiment.
Figure 3B:
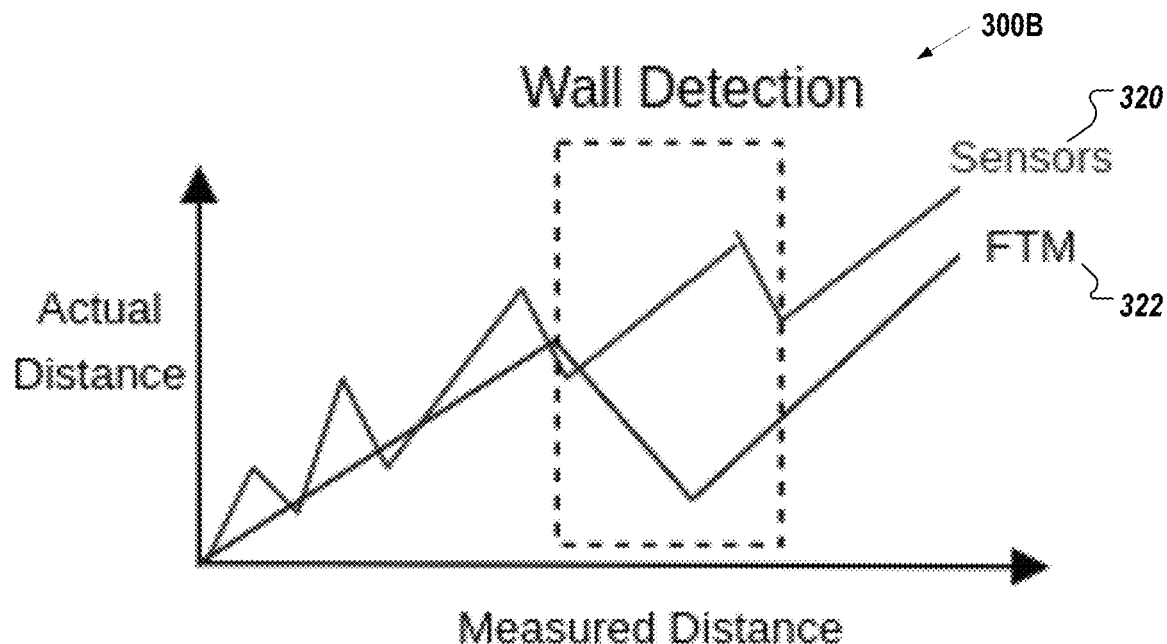

FIG. 3A-B illustrates exemplary obstruction detection and correction of signals between wireless devices, according to one embodiment. As mentioned previously FTM for indoor applications can present challenges to reach a desired accuracy (e.g., meter level accuracy) due to obstructions (e.g., walls, structures, household items) in the pathway between two wireless devices. A distance error correction (e.g., a non-line of sight (NLOS) detection) can be used to update the FTM distance results to provide more accurate distance measurements that account for obstructions such as walls. A first device performs a timing measurement procedure (e.g., FTM protocol as outlined in FIG. 1) at increased distances. As shown in FIG. 3A, a wireless device 306 (e.g., a tablet) may begin in proximity to an FTM device 304 (e.g., AP device, router, endpoint device, smart wireless device, etc.) and the FTM process is performed. The device is moved further away (e.g., along a designed path 308) and FTM is performed multiple times.

FIG. 3B shows a wall detection graph 300B that illustrates an example of errors in an FTM process caused by an obstruction (e.g., a wall). As the wireless device 306 moves away from the FTM device 304 the FTM measurement (data series 322) increases with actual distance. However, once the wall is encountered the FTM loses accuracy and a wall can be detected. To correct the error, additional data is received from the first wireless device 306 is used.

The first wireless device 306 in motion can send data from motion sensors associated with the first wireless device 306. For example, the first wireless device may include a tablet, a cell-phone, or another device with motion sensors capable of providing data associated with the relative motion of the device. For example, motion data 320 is indicative of the relative motion of the device. The relative motion of the device can be combined with FTM data to correct for and provide accurate distance measurement between two wireless devices with a wall disposed in the line of sight of the devices. This correction can calibrate the first wireless device 306 and/or FTM device 304 to apply a correction when sending a signal that is known to pass through an obstruction.

In some embodiments, the wall detection calibration can be used to detect and/or correct errors caused by physical structures. For example, a correction may be stored within the FTM device 304 and can be applied to future applications of the FTM process where the detected obstructed would affect timing measurements. In some embodiments, a device detection and locationing system may identify an obstruction between a first wireless device and a second wireless device and apply a timing measurement correction to a calculated distance based on the identified obstruction.

Figure 4A:
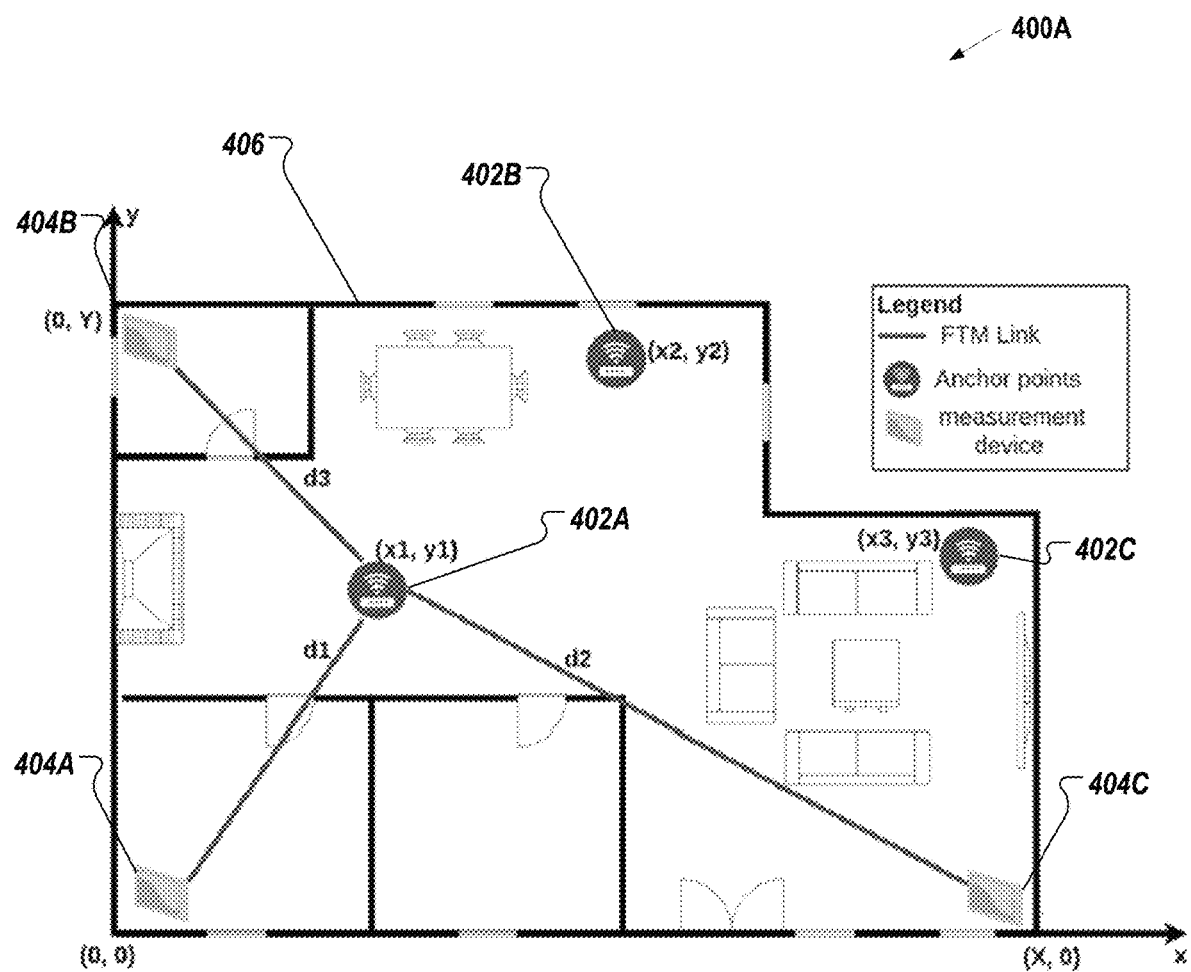
FIGS. 4A-B illustrate anchor device locationing in a two-dimensional (2D) anchor device locationing map and a three-dimensional (3D) anchor device locationing map, according to one embodiment.
Figure 4B:
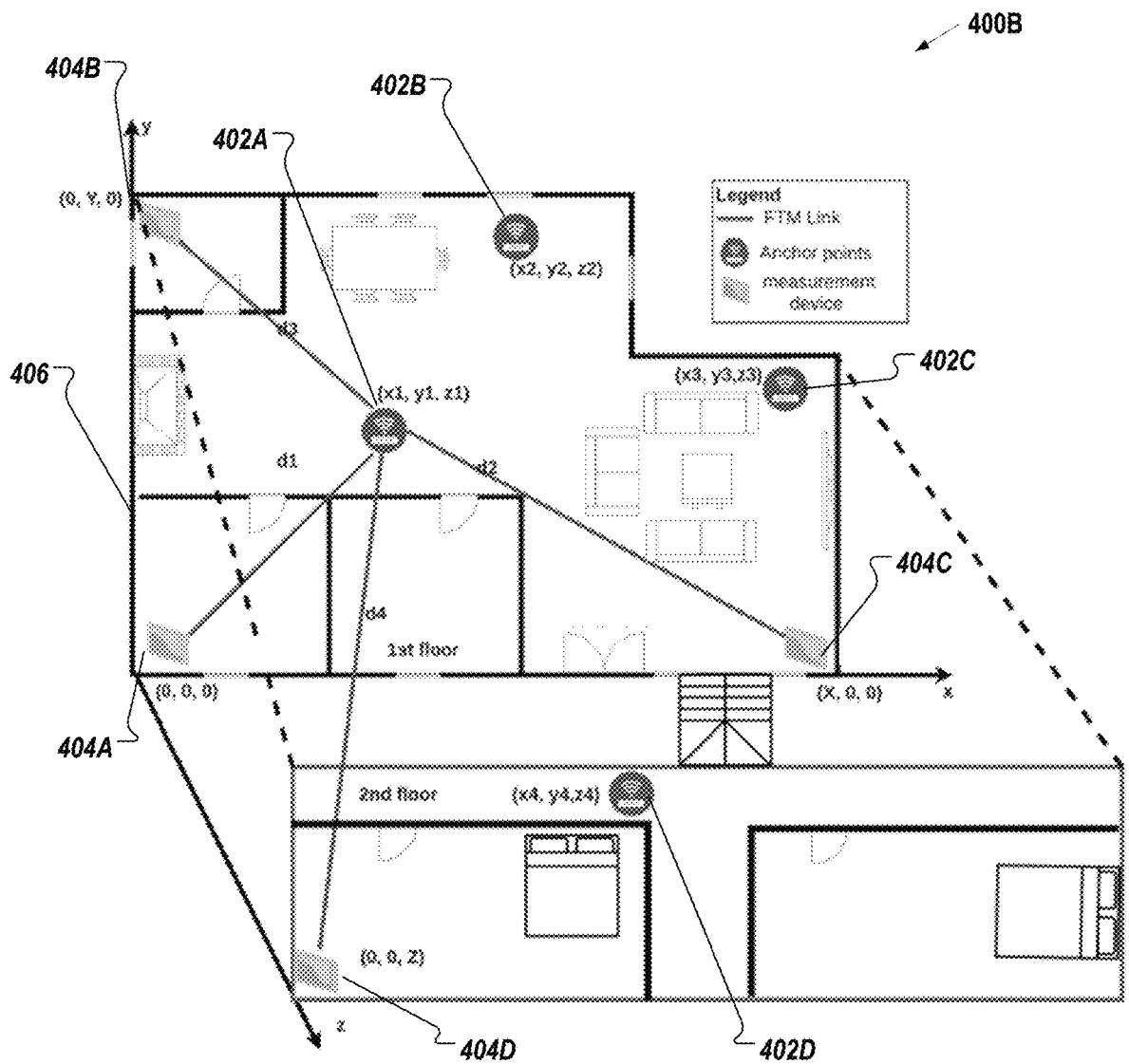

FIGS. 4A-B illustrate anchor device locationing in a two-dimensional (2D) anchor device locationing map 400A and a three-dimensional (3D) anchor device locationing map 400B, according to one embodiment. FIG. 4A illustrates two-dimensional (2D) anchor device locationing map 400A within a defined wireless network region 406. To map out device locations within a network region (e.g., a home), a calibration or anchoring process can be used to pin down locations of probing devices (e.g., anchoring devices 402A-C).

As shown in FIG. 4A, the wireless network may include three (more can be used, as will be discussed further) anchoring devices 402A-C. These anchoring devices can include wireless devices, as previously described (e.g., capable of performing an FTM process or capable of using FTM through alternative means, see FIG. 2), disposed throughout a wireless network region 406. The relative location of each anchoring device 402 can be determined by determining a reference boundary (e.g., associated with a boundary of a house or structure) and identifying the relative location of each anchoring device 402A-C relative to the reference boundary (e.g., using a coordinate system associated with the boundary).

In at least one embodiment, the following location registration methodology is used to determine a relative location of each of the anchoring devices within the reference boundary. Anchoring device location may include determining a first set of reference distances between a measurement device at a first reference location 404A and each of the first anchoring device 402A, the second anchoring device 402B, and the third anchoring device 402C using a timing measurement procedure (e.g., FTM process in the offline mode as outlined in FIGS. 2A-B). The methodology may further include determining a second set of reference distances between the measurement device at a second reference location 404B and each of the first anchoring device 402A, the second anchoring device 402B, and the third anchoring device 402C using a timing measurement procedure. The methodology may further include determining a third set of reference distances between the measurement device at a third reference location 404C and each of the first anchoring device 402A, the second anchoring device 402B, and the third anchoring device 402C using a timing measurement procedure. The methodology may include generating a reference region bounded by at least the first reference location 404A, the second reference location 404B, and/or the third reference location 404C.

In some embodiments, determining the reference boundary can involve the use of a companion application or instructions to be performed by a processor and a wireless calibration device (e.g., cellphone, tablet). A calibration process may include starting FTM mode on all anchor devices and initiating a calibration procedure on the wireless calibration device. The wireless calibration device is brought to a first reference location 404A and initiates an FTM process with each of the anchoring devices 402A-C. The timing data is recorded. The wireless calibration device is brought to a second reference location 404B and initiates an FTM process with each of the anchoring devices 402A-C. The timing data is recorded. The wireless calibration device is brought to a third reference location 404C and initiates an FTM process with each of the anchoring devices 402A-C. The timing data is recorded In some embodiments, a reference frame (e.g., a coordinate system) can be used to identify the reference location and the boundary. For example, the first reference location 404A may be associated with an origin (0, 0). The second reference location 404B may be associated with a first dimension boundary (0, Y). The third reference location 404C may be associated with a second dimension boundary (X, 0). Each anchor device 402A-C can calculate the measured distances from each of these points.

Based on the measured distances, the position of each anchor point can be determined. For example, as seen in FIG. 4A, the measured distance between the first anchoring device 402 and each of the reference locations is d1, d2, and d3. Based on the distance the position of the first anchoring device can be determined to be (x1, y1). Additionally, the position of the second and third anchoring devices can also be determined as (x2, y2) and (x3, y3), respectively.

In some embodiments, using three anchoring devices 402A-C may result in a rectangle reference boundary. However, more than three devices can be used to generate a reference region with more than four sides. For example, as shown in FIG. 4A the reference boundary of the floorplan has six external sides with six corners. The calibration process may be performed at each corner of the reference boundary to generate a reference boundary that outlines the boundary of the structure (e.g., a home).

In some embodiments, as shown in FIG. 4B, some wireless networks are configured to provide service to structures with multiple levels (e.g., stories or floors) in a third dimension (e.g., Z direction). A fourth reference location 404D may be used to define a boundary in the third dimension. For example, following similar methodology in embodiments previously described, a calibration process may further include determining a fourth set of reference distances between the measurement device at a fourth reference location 404D and each of the first anchoring device 402A, the second anchoring device 402B, and the third anchoring device 402C using a timing measurement procedure. The methodology may include generating a reference region bounded by at least the first reference location 404A, the second reference location 404B, the third reference location 404C, and/or the fourth reference location 404D. In some embodiments, the reference region (e.g., a house) may be a 3D rectangular prism. However, in other embodiment, multiple reference locations (e.g., beyond four) may be used to generate a 3D boundary with more edges that is cable of aligning with multiple edges of a structure associated with the wireless network.

In some embodiment, as described previously in the 2D reference region embodiments, determining the reference boundary can involve the use of a companion application or instructions to be performed by a processor and a wireless calibration device (e.g., cellphone, tablet). A calibration process may further include starting FTM mode on all anchor devices and initiating a calibration procedure on the wireless calibration device. The wireless calibration device is brought to first, second, and third reference locations 404A-C and initiates an FTM process with each of the anchoring devices 402A-C at each reference location 404A-C. The timing data is recorded. The wireless calibration device is brought to a fourth reference location 404D and initiates an FTM process with each of the anchoring devices 402A-C. The timing data is recorded.

In some embodiments, as described previously in the 2D reference region, a reference frame (e.g., a coordinate system) can be used to identify the reference location and the boundary. For example, the first reference location 404A may be associated with an origin (0, 0, 0). The second reference location 404B may be associated with a first dimension boundary (0, Y, 0). The third reference location 404C may be associated with a second dimension boundary (X, 0, 0). The fourth reference location 404D may be associated with a third dimension boundary (0, 0, Z). Each anchor device 402A-C can calculate the measured distances from each of these points.

Based on the measured distances, the position of each anchor point can be determined. For example, as seen in FIG. 4B, the measured distance between the first anchoring device 402A and each of the reference locations is d1, d2, d3, and d4. Based on the distance the position of the first anchoring device can be determined to be (x1, y1, z1). Additionally, the position of the second, third, and fourth anchoring devices can also be determined as (x2, y2, z2), (x3, y3, z3), and/or (x4, y4, z4), respectively.

It should be noted that more than three anchoring devices can be used to take further measurement data and/or more than fourth reference locations can be used to further refine the reference frame (e.g., coordinate system).

Some embodiments described previously make use of a reference frame that incorporates a Cartesian coordinate system. However, the use of a Cartesian coordinate system is purely exemplary. The reference frame and measurement data may be labeled, calculated, and/or processed using any reference frame system capable of identifying a relative location of the anchoring points within a reference region bounded by the reference locations. For example, one or more number lines, polar coordinate system, cylindrical and/or spherical coordinate systems, homogeneous coordinate systems, weighted coordinate system, and so on can be utilized to perform device detection and locationing, as described herein.

Figure 5:
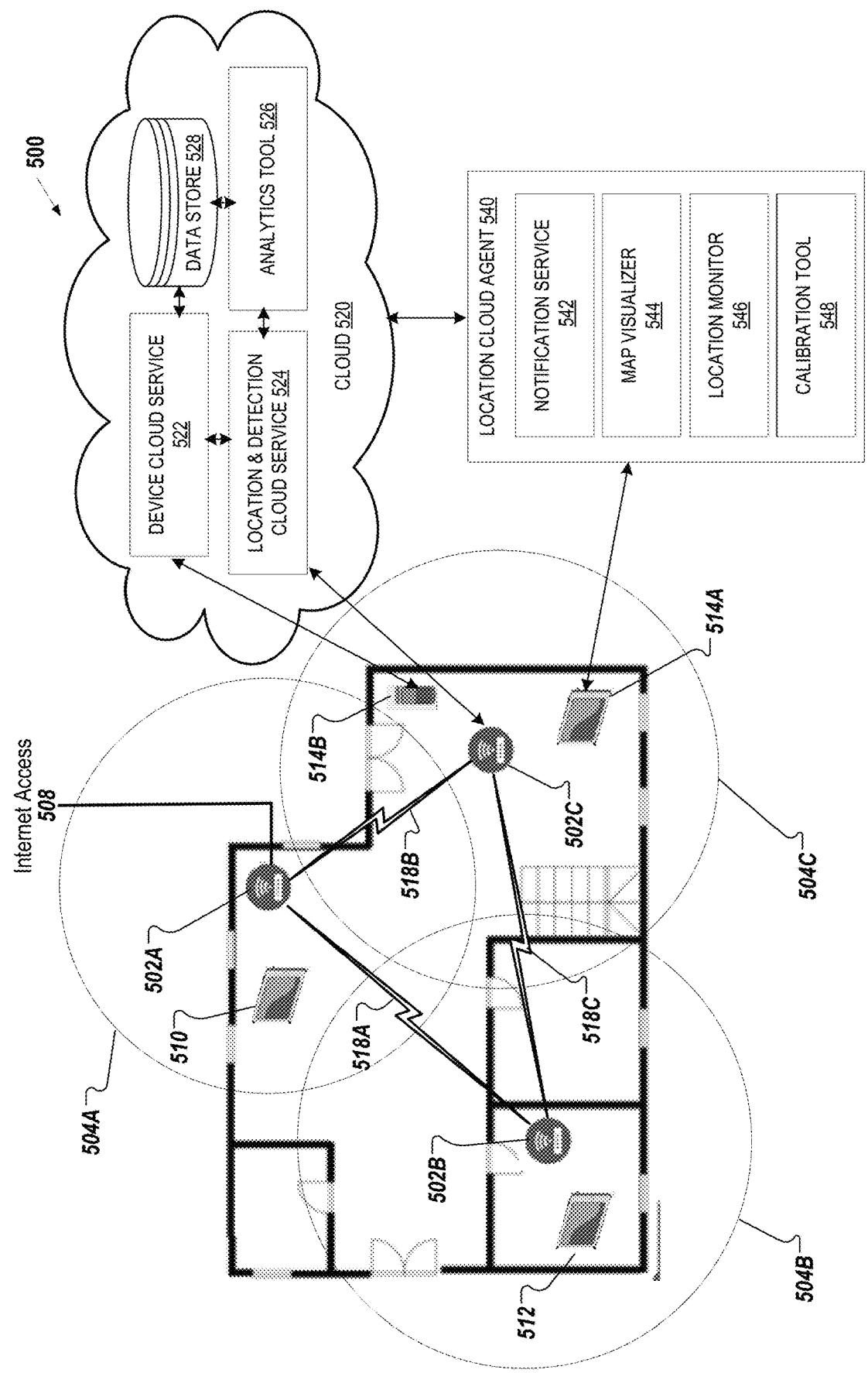
FIG. 5 illustrates a device detection and locationing system, according to some embodiments.

FIG. 5 illustrates a device detection and locationing system 500, according to some embodiments. The device detection and location system 500 can include multiple wireless devices 502A (e.g., wireless access point 110 and/or mesh access points 114, 116 associated with FIG. 1)

In at least one embodiment, first wireless device 502A and second wireless device 502B operate in a same channel or adjacent channel. First wireless device 502A provides backhaul connectivity to device detection and locationing system 500, such as using a wired or wireless connection 508 to the Internet. For example, wireless device 502A can be connected to a gateway or a modem via wired or wireless connection 508. Alternatively, first wireless device 502A can be a router or a gateway and can provide internet access to second wireless device 502B and third wireless device 502C described below. First wireless device 502A can provide a first AP to wireless devices, such as endpoint device 510, in a first AP coverage area 504A on a first channel. One or more endpoint devices 510 can also be referred to as client devices or stations (STAs).

Second wireless device 502B can establish a first wireless connection 518A with first wireless device 502A. In some embodiments, second wireless device 502B can provide a second AP to wireless coverage area 504B. Second wireless device 502B can establish one or more second wireless connections with the one or more endpoint devices (e.g., endpoint device 512). One or more endpoint devices 512 can be a computer, a smartphone, a voice-controlled device, a wireless display, a wireless speaker, a game console, a wireless gamepad, or the like. In some cases, a primary radio is used to connect second wireless device 502B to first wireless device 502A, for internet access and a secondary radio is used to create a second AP for connecting endpoint devices 512. Both radios can operate in the same band or separate bands.

In at least one embodiment, a third wireless device 502C can connect to first wireless device 502A over a wireless connection 518B and can provide a third AP connect to one or more endpoint devices 514A-B within third AP coverage area 504C. Third wireless device 502C can provide a third AP to wireless devices, such as endpoint devices 514A-B, in a third AP coverage area 504C. Alternatively, positioning and locationing system 500 can include more than first wireless device 502A, second wireless device 502B, and third wireless device 503C to distribute network access across the wireless network.

In at least one embodiment, the second wireless device may initiate a timing measurement procedure (e.g., FTM protocol as described in association with FIG. 2A-B) between the third wireless device and/or the first wireless device. The second wireless device may receive timing data associated with the timing measurement protocol. This timing data may be used to determine a distance between the second wireless device 502B and the third wireless device 502C and/or the first wireless device 502A.

During operation, in at least one embodiment, second wireless device 502B establishes first wireless connection 518A with first wireless device 502A using a first radio (e.g., a first WLAN ratio), where the first wireless device 502A operates as a first AP on a first channel and provides Internet access. After first wireless connection 518A is established, second wireless device 502B can send, to the first wireless device, a first indication that the second wireless device is to operate in an off-channel mode with a first neighboring wireless device (e.g., third wireless device 502C and/or endpoint devices 510, 512, and/or 514A-B) using a Fine Timing Measurement (FTM) protocol (e.g., FTM procedures described in FIGS. 2A-B). The second wireless device 502B performs, in the off-channel mode, first timing measurements with the first neighboring device using an FTM process. The second wireless device 502B receives first timing data associated with the first timing measurements. The second wireless device 502B determines a first distance between the first wireless device and the first neighboring device based on the first timing data.

In at least one embodiment, scheduling logic may be used to coordinate the performance of the timing measurement procedure. For example, scheduling logic can leverage a Target Wake Time (TWT) feature, as set forth as an optional feature in IEEE 802.11ah. TWT allows devices in a single AP network to remain in an idle mode (e.g., sleep mode) longer and, upon transition from idle mode to an active mode, perform frame exchange with an AP device at schedule predefined TWT intervals. A TWT schedule defines periodic intervals, including a start time and an amount of time, in which a client device can wake up (i.e., a transition from idle mode to active mode) and perform frame exchange (e.g., the timing measurement procedure) with an AP device. For example, the TWT feature in IEEE 802.11ax allows an AP to define a periodic schedule to let downstream devices perform exchange during scheduled times to save device power, allowing these devices to awake at regular intervals for short period and sleep for the rest of the period outside of the TWT schedules. The TWT schedule can be dynamic and can be advertised in a beacon frame, an action frame, or the like. An IEEE 802.11ax-compatible device can perform data exchanges in a TWT period upon receiving a trigger from an AP. Thus, an AP can control and coordinate the performance of timing measurement procedures between devices (e.g., to prevent interference between multiple timing measurement procedures being performed simultaneously to each other).

In some embodiments, a first endpoint device (e.g., any of endpoint devices 510, 512, 514A-B) may perform the timing measurement procedure with another wireless device. For example, an endpoint device associated with the first wireless device may perform the timing measurement procedure with the second wireless device 502B to determine a distance between the corresponding endpoint device and the second wireless device 502B. In some embodiments, endpoint devices 510, 512, 514A-B may perform the timing measurement procedure with other endpoint devices 510, 512, 514A-B. For example, an endpoint device 510 associated with the first wireless device 502A may perform a timing measurement procedure with another endpoint device 512 associated with the second wireless device 502B. As described in association with FIG. 2, the performance of the timing measurement procedure may be performed off-channel (e.g., in a frequency and/or bandwidth that is not associated with the Internet providing channel of the access point (AP) device).

In at least one embodiment, the second wireless device 502B and/or the third wireless device 502C do not provide an AP in addition to the AP provided by the first wireless device. The second wireless device 502B and/or the third wireless device 502C may also be endpoint devices that do not provide an AP for additional endpoint devices.

In some embodiments, the devices performing the timing may include devices that support 802.11mc. In another embodiment, devices that do not natively support 802.11 ms may add the feature in a SoftAP mode or Target Wake Time (TWT). Multiple devices (e.g., at least three) can be grouped together to participate in device locationing. The group of devices can be preconfigured to activate the location probing mode on a pre-configured schedule. The location probing mode can include activating a SoftAP by a device. The SoftAP activates the FTM mode and the locationing data acquired in FTM mode can be uploaded to a cloud system and a dedicated cloud service can process the data and map the device location, as will be discussed further in other embodiments. In some embodiments, devices grouped together can share and participate in the same TWT schedule. During the TWT, devices in the group can perform FTM sequentially.

As shown in FIG. 5 wireless devices in the wireless network can connect to a cloud network 520 that can control and manage device detection and locationing within the wireless network. In some embodiments, calibration measurements (e.g., methodology associated with FIGS. 4A-B) can be used to determine a reference frame and/or reference boundary of the wireless network. Wireless devices 502A-C may act as anchoring devices that provide a reference location within a determined reference frame of the wireless network. One or more of the wireless devices 502A-C may perform a timing measurement process (e.g., FTM process outlined in FIG. 2A-B) to determine a distance from the associated device. The cloud network 520 may include a location and detection cloud server that coordinates multiple timing measurement processes as previously described to track devices' location. The cloud network 520 may include a data store 528 to store locationing information. The cloud network 520 may include an analytics tool 526 that can process that data and make determinations associated with device locationing, device detection, signal strength detection, and/or other determinations associated with the wireless network as discussed in other embodiments.

In some embodiments, the cloud network 520 may include a device cloud service 522. The device cloud service 522 may provide an interface for endpoint devices. For example, a device cloud service may provide an appropriate back end service for an endpoint device (e.g., endpoint device 514B). For example endpoint device 514 may include a computer, a smartphone, a voice-controlled device, a wireless display, a wireless speaker, a game console, a wireless gamepad, or the like and the device cloud service may provide appropriate back end functionality associated with the endpoint device. The device cloud service may acquire additional data associated with the endpoint device 514B such as usage data, locationing, and positioning data, and so on.

As shown in FIG. 5, an endpoint device (e.g., 514A) may include a location cloud agent (e.g. a client device application) that provides interaction between a user and the cloud network 520. For example, the location cloud agent 540 may include a notification service 542. The notification service 542 may include predetermined criteria associated with the detection and/or locationing of devices within the wireless network. For example, detecting when a foreign device crosses a reference boundary associated with the wireless network.

As shown in FIG. 5, the location cloud agent 540 may include a map visualizer 544. The map visualizer 544 may provide a visual depiction of the calibrated reference frame associated with the wireless network. For example, an outline of the boundary of a home may be displayed. The map visualizer 544 may further depict the locations of devices associated with the wireless network. The location cloud agent 540 may include a location monitor 546. The location monitor may work with the map visualizer 544 to display the locations of each of the devices within the reference frame. The location monitor 546 may work with the notification service 542 to flag devices that meet a predetermined criterion. For example, the location monitor 546 may monitor the location of each of the devices of the wireless network and identify when a device has left the boundary of the reference frame.

As shown in FIG. 5, the location cloud agent 540 may include a calibration tool 548. The calibration tool 548 may include processing functionality associated with determining the boundary of a reference frame (e.g., identifying a boundary of a home). For example, calibration tool 548 may include methodology associated with identifying a relative location of anchor points (e.g., wireless devices 502A-C) within a reference frame (e.g., home). For example, calibration tool 548 may make use of calibration processes described in association with FIGS. 4A-B.

Figure 6A:
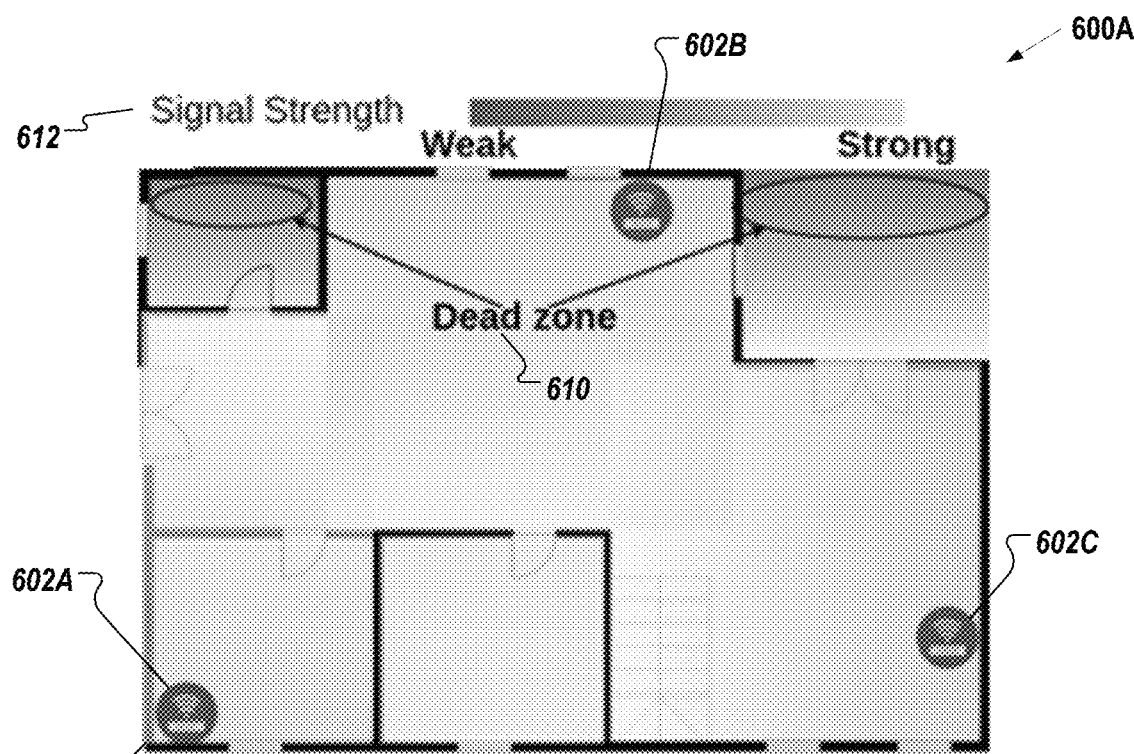
FIG. 6A-C depict exemplary device locationing and detection processes, according to some embodiments
Figure 6B:
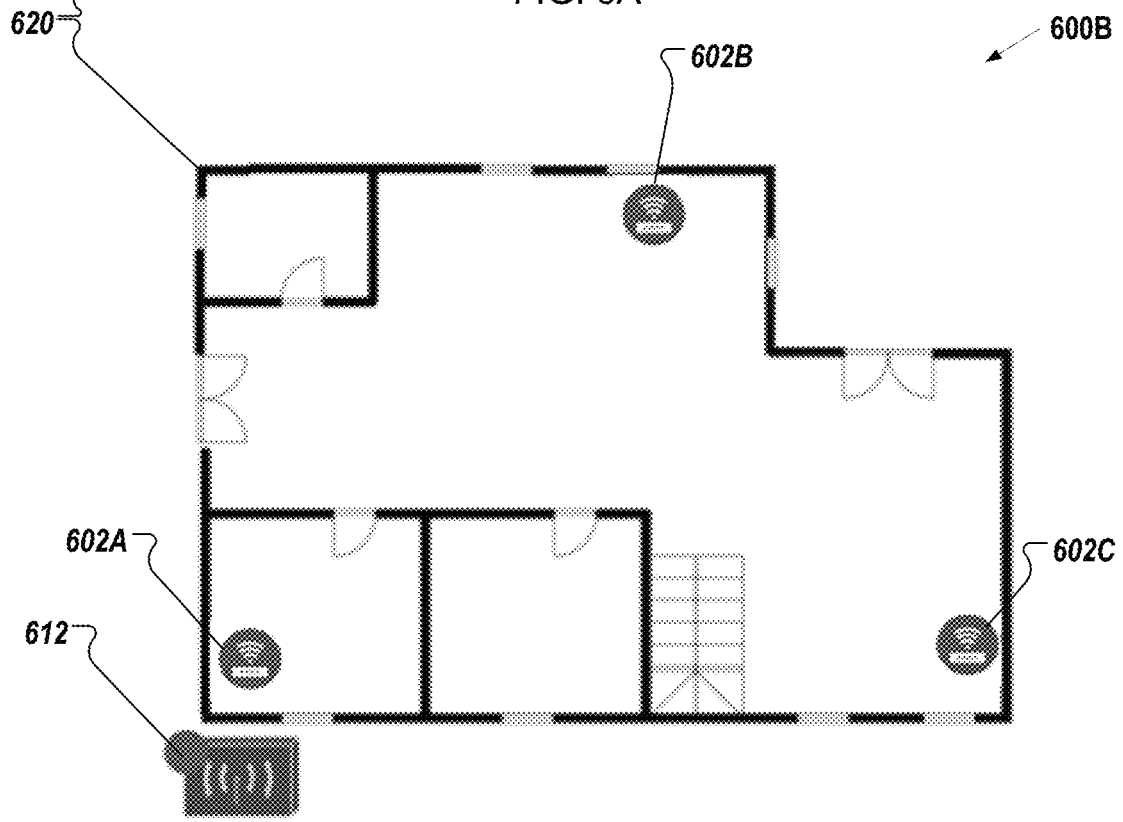
Figure 6C:
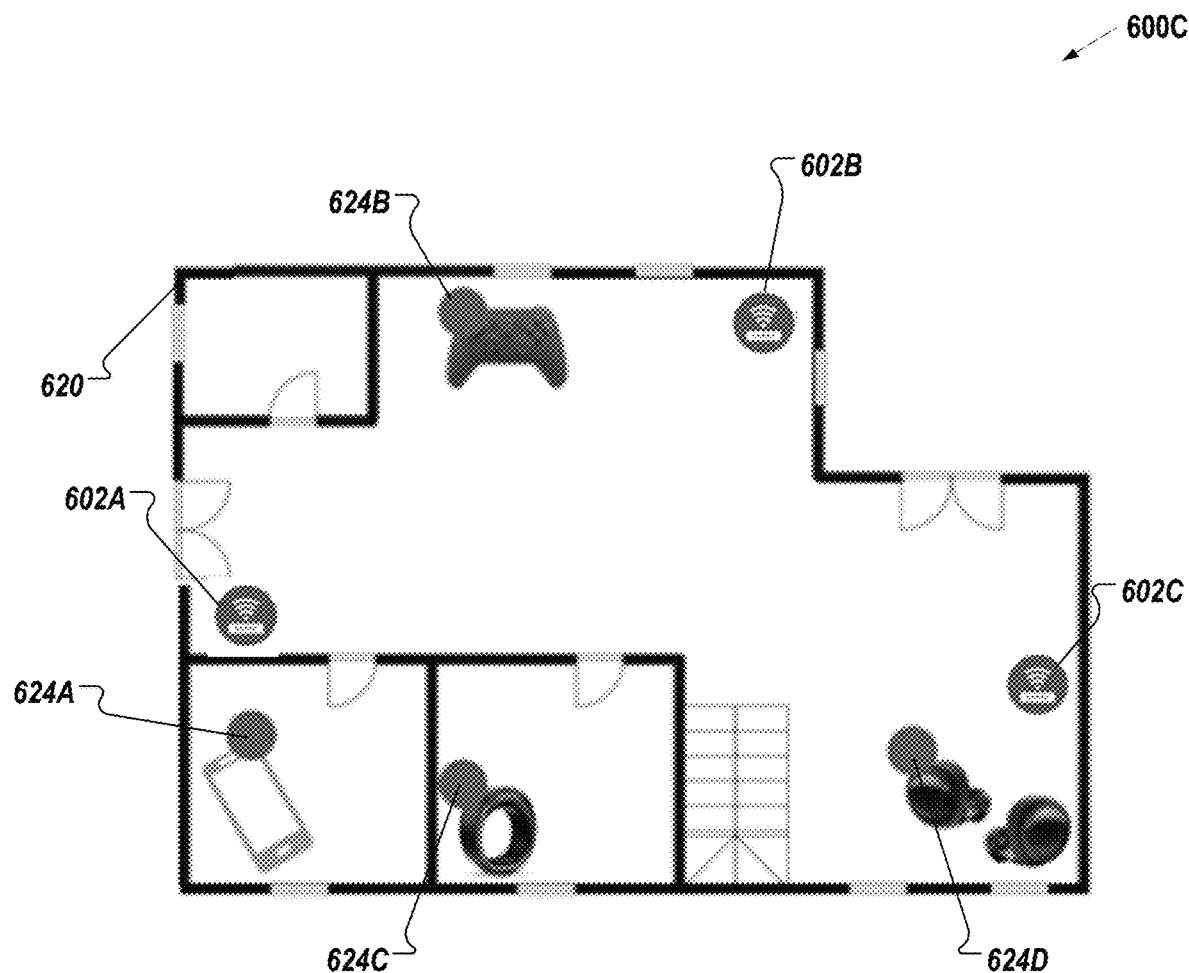

FIG. 6A-C depict exemplary device locationing and detection processes, according to some embodiments. FIG. 6A is a map 600A illustrating signal strength 612 of a wireless network. As discussed in other embodiments, a wireless device detection and locationing system can be calibrated to determine a relative location of each anchoring device 602A-C of a wireless network (See FIG. 4A-4B) within a coverage area 620. Additionally, as discussed previously, the anchoring device can detect a location of devices within the wireless network. With device locations mapped out, the system can create a wireless coverage map 600A (e.g., using a location monitor 546 and/or map visualizer 544). Data, in addition to location data, can be received from the wireless devices. For example, an anchoring device can determine a first signal strength from a first neighboring device. As that device moves around the signal strength is tracked. As a result, the system is capable of identifying a signal strength across a wireless network. For example, zones or sub-regions of the wireless that are below a threshold signal strength (e.g., dead zones 610) can be identified and presented to a user (e.g., through notification service 542). The service may recommend an improved Wi-Fi access point/router deployment that may improve overall signal strength across a coverage area provided by the wireless network.

In some embodiments, a device detection and locationing system may determine a relative location of a new wireless device disposed within a calibrated reference region based on a set of distance measurements (e.g., obtained using FTM processes and/or other device distance calculation (e.g., RSSI)). The system may determine a connection strength between the new wireless device and an anchoring device. This data may be used to determine a collective connectivity strength of a-sub-region of the reference region associated with a location of the new device.

FIG. 6B is a map 600B illustrating a rogue device detection process. As discussed in other embodiments, a wireless device detection and locationing system may include device tracking. In some embodiments, the system is capable of identifying devices disposed within a distance from each of the anchoring device 602A-C. The wireless device detection and locationing system can be calibrated (e.g., using calibration tool 548 of FIG. 5) to determine a reference frame and/or boundary. A new device (e.g., a rogue device) may communicate a signal to one or more of anchoring devices 602A-C. The anchoring devices can determine, using methods described herein or other methods for calculating a distance between two wireless devices, a distance from one or more of the anchoring devices 602A-C to the new device. The system may determine a relative location of the new device based on the distance measurements. The system can determine whether the new device is located within the reference boundary. Data, including identifying information, may be obtained from the new device and compared against a list of known devices to determine whether the new device is known by the system. The system can determine that the device is unknown and located within the reference frame. The system can prompt a user (e.g., through notification service 542 of FIG. 5) of the presence of the new device. In some embodiments, the prompt can be accompanied by a map display (e.g., using map visualizer 544) showing the relative location of the new device and/or displaying identifying information of the new device.

In some embodiments, the wireless device detection and locationing system can detect wireless devices carried by an intruder, a hidden device planted by a rogue guest, a foreign device inadvertently left on or around the coverage area 620 but could pose a risk to the wireless network, among other things.

FIG. 6C is a map 600C depicting a device locationing application. As described previously the wireless device detection and locationing system can track the locations of wireless devices within a coverage area provided by the wireless network (e.g., through location monitor 546 of FIG. 5). For example, the anchoring devices 602A-C may communicate with wireless devices 624A-D to determine a first location. The anchoring devices 602A-C may communicate with wireless devices 624A-D to determine a second location after a period of time. Communication between the anchoring devices 624A-D may occur on a schedule, similar to communication schedules described herein. Additionally, the detection and location system may store data over a period of time that includes device locations. Device location data may be stored on a data store (e.g., data store 528). The device detection and locationing system may include an analytics tool (e.g., analytics tool 526) that processes the data (e.g., statistical analysis, comparing data against predetermined criteria, combining with usage data to predict future device locationing, and so on).

In some embodiments, the wireless device detection and locationing system may include a map visualizer (e.g., map visualizer 544o f FIG. 5) that prepares for presentation on an endpoint device a visual depiction of the locations of each device in the wireless network. For example, map 600C, as seen in FIG. 6C, depicts the location of wireless devices 624A-D relative to a reference frame (e.g., the boundary of the house).

Figure 7:
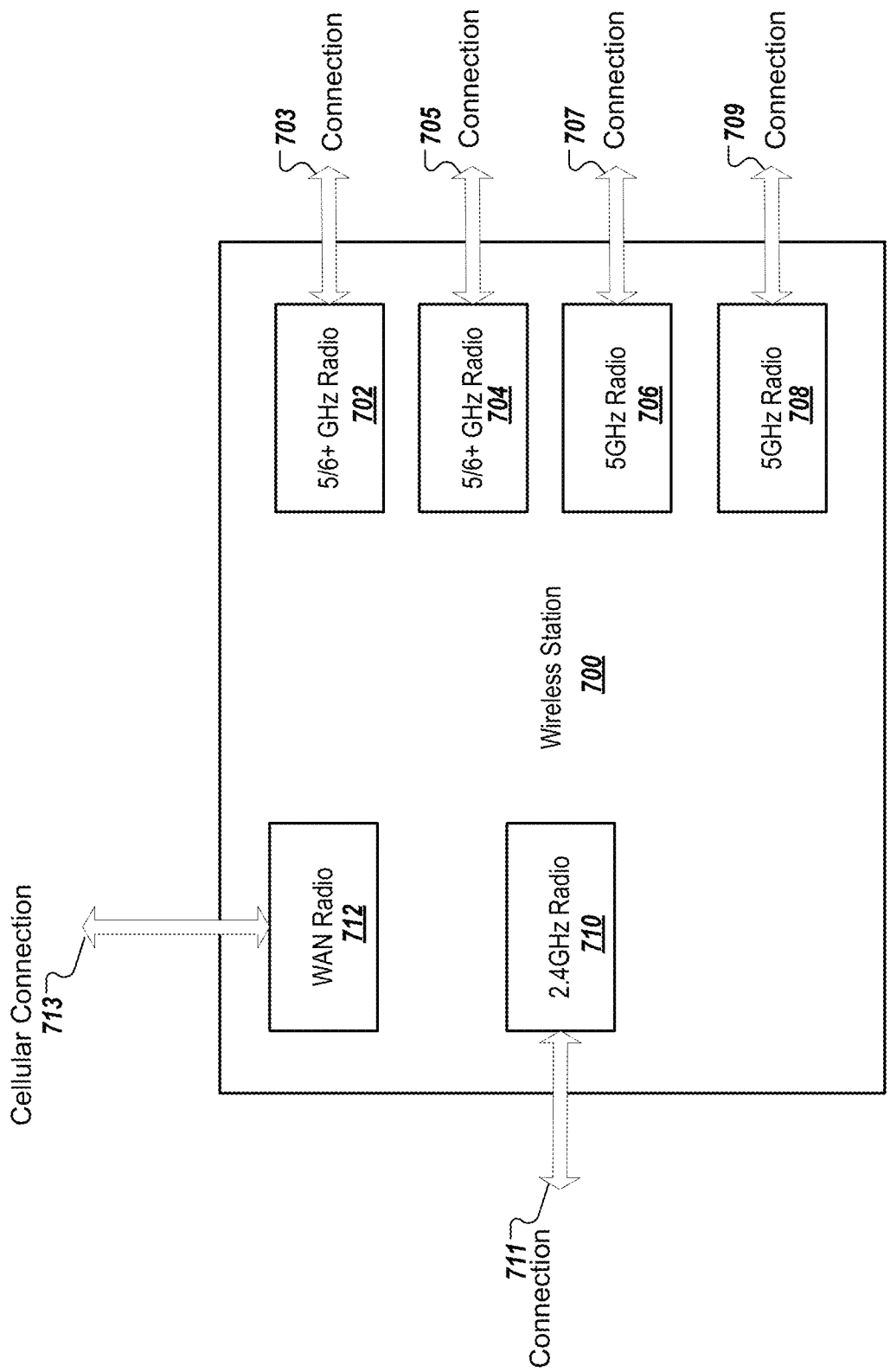
FIG. 7 is a block diagram of a wireless station with multiple radios according to one embodiment.

FIG. 7 is a block diagram of a wireless station 700 with multiple radios according to one embodiment. The wireless station 700 includes a first 5/6+GHz radio 702, a second 5/6+GHz radio 704, a third 5 GHz radio 706, a fourth 5 GHz radio 708, a 2.4 GHz radio 710, and a cellular radio 712. The first 5/6+GHz radio 702 creates a first wireless connection 703 between the wireless station 700 and another wireless station (not illustrated) in a WLAN network. Connection 703 may be a 5 GHz connection, a 6 GHz connection, and/or a connection greater than 6 GHz (e.g., wide-and and/or ultra wideband). The second 5 GHz radio 704 creates a second wireless connection 705 between the wireless station 700 and another wireless station (not illustrated) in the WLAN network. Connection 704 may be a 5 GHz connection, a 6 GHz connection, and/or a connection greater than 6 GHz (e.g., wide-and and/or ultra wideband). The third 5 GHz radio 706 creates a third wireless connection 707 between the wireless station 700 and another wireless station (not illustrated) in the WLAN network. The fourth 5 GHz radio 708 creates a fourth wireless connection 709 between the wireless station 700 and another wireless station (not illustrated) in the WLAN network. The 2.4 GHz radio 710 creates a wireless connection 711 between the wireless station 700 and a client consumption device (not illustrated) in the WLAN network. This wireless connection may be one of a second set of one or more WLAN connections that operate at a second frequency of approximately 2.4 GHz. The cellular radio 712 creates a cellular connection between the wireless station 700 and a device in a cellular network (not illustrated). In other embodiments, more than one 2.4 GHz radios may be used for more wireless connections. Alternatively, a different number of 5/6+GHz radios may be used for more or less wireless connections with other wireless stations. In other embodiments, multiple cellular radios may be used to create multiple cellular connections.

In some embodiments, the wireless station 700 may be any one of the wireless communication devices described herein. Multiple network hardware devices are wirelessly connected through a network backbone formed by multiple wireless connections. These wireless connections are wireless connections between different pairs of the network hardware devices. These wireless connections may be a first set of WLAN connections that operate at a first frequency of approximately 5.0 GHz, 6.0 GHz, and/or a frequency greater than 6.0 GHz. The multiple network hardware devices may be wirelessly connected to one or more client consumption devices by one or more wireless connections. Also, the multiple network hardware devices may be wirelessly connected to a network control services device by cellular connections. Each network hardware device includes a cellular connection to a service hosted by a cloud computing system. The cellular connections may have lower bandwidths than the point-to-point wireless link.

In some embodiments, the wireless station 700 includes memory to store content files, control and command data, as well as the aggregate data described herein. The memory of the first network hardware device may be volatile memory, non-volatile memory, or a combination of both. When a content file is not stored in the memory or the storage of the wireless station 700, the wireless station 700 generates and sends a request to another station in the network. Intervening network hardware devices can make similar determinations to locate the content file in the network.

In a further embodiment, the wireless connections 703, 705, 707, 709 are WLAN connections that operate in a first frequency range and connection 711 is a WLAN connection that operates in a second frequency range. In another embodiment, the wireless connections 703, 705, 707, 709 operate at a first frequency of approximately 5.0 GHz and the connection 511 operates at a second frequency of approximately 2.4 GHz. One or more of connections 703, 705, 707, 709 operate at a third frequency of approximately 6.0 GHz or a frequency greater than 6.0 GHz (e.g., wideband, ultrawideband).

Figure 8:
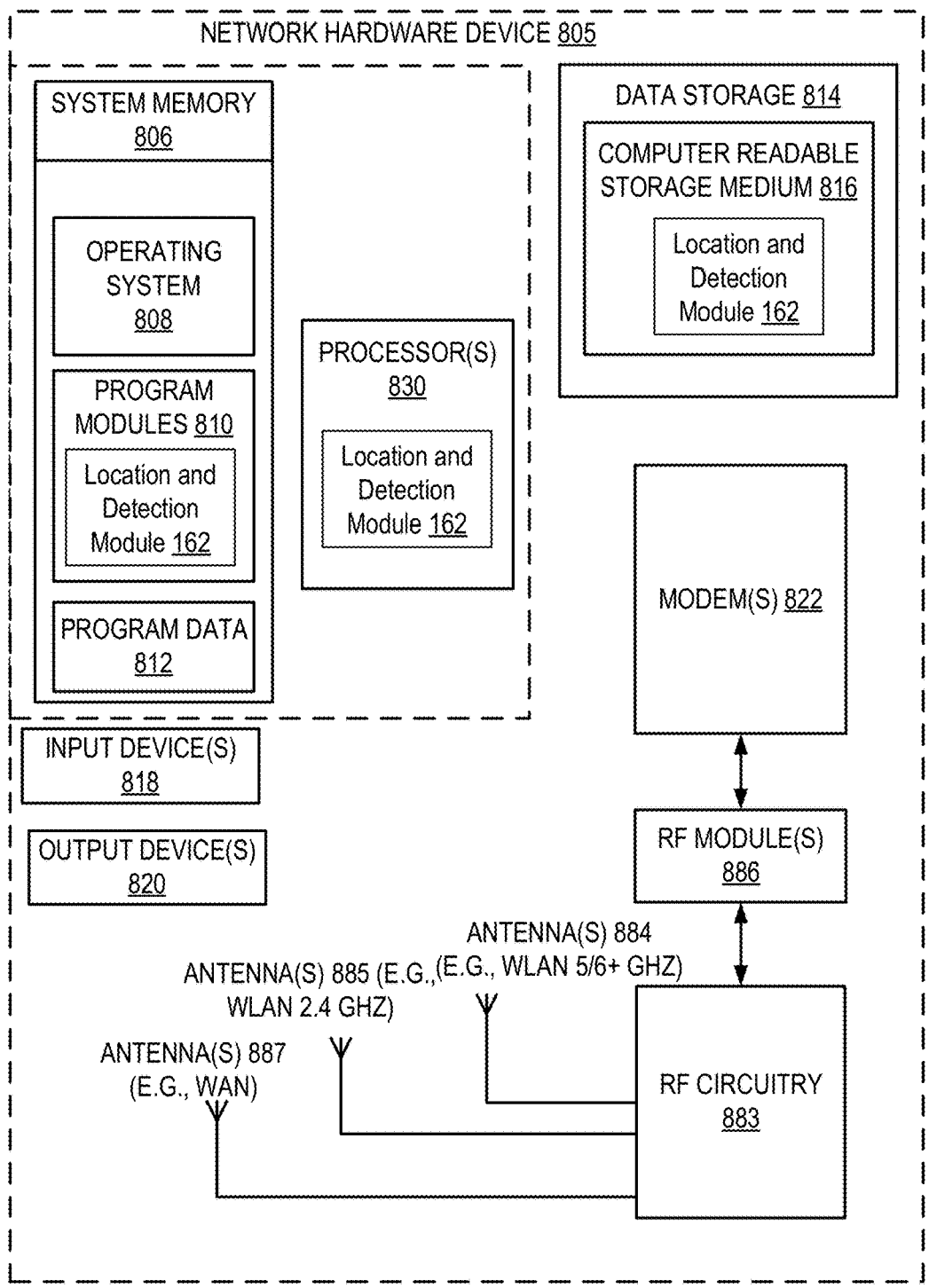
FIG. 8 is a block diagram of a network hardware device with a device location and detection module, according to one embodiment.

FIG. 8 is a block diagram of a network hardware device 800 with a device location and detection module 162, according to one embodiment. The network hardware device 800 may correspond to the network hardware device or any of wireless communication devices 120, 130, and 140, or a server executing network service 160, as shown in FIG. 1. In another embodiment, the network hardware device 800 may correspond to the wireless station 700 of FIG. 7. Alternatively, the network hardware device 800 may be other electronic devices, as described herein.

The network hardware device 800 includes one or more processor(s) 830, such as one or more CPUs, microcontrollers, field-programmable gate arrays, or other types of processors. The network hardware device 800 also includes system memory 806, which may correspond to any combination of volatile and/or non-volatile storage mechanisms. The system memory 806 stores information that provides operating system component 808, various program modules 810, program data 812, and/or other components. The program modules 810 may include instructions of the device location and detection module 162. In one embodiment, the system memory 806 stores instructions of methods to control the operation of the network hardware device 800. The network hardware device 800 performs functions by using the processor(s) 830 to execute instructions provided by the system memory 806.

The network hardware device 800 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the network hardware device 800, the system memory 806 and the processor(s)

830 also constituting computer-readable media. The network hardware device 800 may also include one or more input devices 818 (keyboard, mouse device, specialized selection keys, etc.) and one or more output devices 820 (displays, printers, audio output mechanisms, etc.).

The network hardware device 800 further includes a modem 822 to allow the network hardware device 800 to communicate via wireless connections (e.g., such as provided by the wireless communication system) with other computing devices, such as remote computers, an item providing system, and so forth. The modem 822 can be connected to one or more RF modules 886. The RF modules 886 may be a WLAN module, a WAN module, a personal area network (PAN) module, a GPS module, or the like. The antenna structures (antenna(s) 884, 885, and 887) are coupled to the RF circuitry 883, which is coupled to the modem 822. The RF circuitry 883 may include radio front-end circuitry, antenna switching circuitry, impedance matching circuitry, or the like. In one embodiment, the RF circuitry 883 includes the RFFE circuitry with high selectivity performance as described in the various embodiments of FIGS. 1-6. The antennas 884 may be GPS antennas, NFC antennas, other WAN antennas, WLAN or PAN antennas, or the like. The modem 822 allows the network hardware device 800 to handle both voice and non-voice communications (such as communications for text messages, multimedia messages, media downloads, web browsing, etc.) with a wireless communication system. The modem 822 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 822 may generate signals and send these signals to antenna(s) 884 of a first type (e.g., WLAN ⅚+GHz), antenna(s) 885 of a second type (e.g., WLAN 2.4 GHz), and/or antenna(s) 887 of a third type (e.g., WAN), via RF circuitry 883, and RF module(s) 886 as described herein. Antennas 884, 885, and 887 may be configured to transmit in different frequency bands and/or using different wireless communication protocols. The antennas 884, 885, and 887 may be directional, omnidirectional, or non-directional antennas. In addition to sending data, antennas 884, 885, and 887 may also receive data, which is sent to appropriate RF modules connected to the antennas. One of the antennas 884, 885, 887 may be any combination of the antenna structures described herein.

In one embodiment, the network hardware device 800 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 822 is shown to control transmission and reception via antenna (884, 885, 887), the network hardware device 800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A first wireless device comprising:
   a first wireless local area network (WLAN) radio, wherein the first wireless device is a part of a WLAN associated with a dwelling; and
   a processor coupled to the first WLAN radio, wherein the first wireless device:
      establishes a first wireless connection with a second wireless device, the second wireless device provides internet access to the first wireless device on a first channel in the WLAN;
      sends first data to the second wireless device, the first data indicating that the first wireless device communicates with a neighboring wireless device using a Fine Timing Measurement (FTM) protocol;
      sends, to the neighboring wireless device over a second channel, a first request that causes the neighboring wireless device to perform an FTM process, wherein the second channel is different than the first channel;
      receives, from the neighboring wireless device over the second channel, a second request comprising a first timestamp indicative of a departure time of the second request from the neighboring wireless device;
      sends, to the neighboring wireless device over the second channel, a first acknowledgment associated with the second request, the first acknowledgment comprising a second timestamp and a third timestamp, the second timestamp being indicative of an arrival time of the second request at the first wireless device, and the third timestamp being indicative of a departure time of the first acknowledgment from the first wireless device;
      receives, from the neighboring wireless device over the second channel, a second acknowledgment comprising a fourth timestamp indicative of an arrival time of the first acknowledgment at the neighboring wireless device;
      determines a first distance between the first wireless device and the neighboring wireless device based on the first timestamp, the second timestamp, the third timestamp, and the fourth timestamp;
      determines a second distance between the first wireless device and a second neighboring wireless device by performing the FTM protocol between the first wireless device and the second neighboring wireless device;
      determines a third distance between the first wireless device and a third neighboring wireless device by performing the FTM protocol between the first wireless device and the third neighboring wireless device; and
      determines a relative position of the first wireless device within the dwelling using the first distance, the second distance, and the third distance.

2. A method comprising:
   establishing a first wireless connection between a first wireless device and a second wireless device on a first channel, wherein the second wireless device is associated with a dwelling;
   sending, by the first wireless device to the second wireless device, a first indication that the first wireless device is to communicate with a third wireless device, different from the second wireless device, at a first location using a Fine Timing Measurement (FTM) procedure;
   determining, by the first wireless device, first timing data comprising a signal round trip time (RTT) associated with a first FTM process, wherein the first FTM process is between the first wireless device and the third wireless device;
   determining a first distance between the first wireless device and the third wireless device based on the first timing data; and
   determining a second location of the first wireless device within the dwelling using at least the first distance.

3. The method of claim 2, further comprising:
   determining, by the first wireless device, second timing data comprising a signal RRT associated with a second FTM process, wherein the second FTM process is between the first wireless device and a fourth wireless device at a third location;
   determining a second distance between the first wireless device and the fourth wireless device based on the second timing data;
   determining, by the first wireless device, third timing data comprising a signal RRT associated with a third FTM process, wherein the third FTM process is between the first wireless device and a fifth wireless device at a fourth location;
   determining a third distance between the first wireless device and the fifth wireless device based on the third timing data;
   generating data indicative of a region associated with the dwelling, wherein generating the data is based on at least the first location, the third location, and the fourth location; and
   determining the second location of the first wireless device further using the second distance and the third distance, wherein the second location is within the region.

4. The method of claim 3, wherein the dwelling has a first floor and a second floor, the method further comprising:
   determining fourth timing data comprising a signal RRT associated with a fourth FTM process, wherein the fourth FTM process is between the first wireless device and a sixth wireless device at a fifth location; and
   determining a fourth distance between the first wireless device and the sixth wireless device based on the fourth timing data,
   wherein the first location is on the first floor and the fifth location is on the second floor, and
   wherein determining the second location further includes using the fourth distance.

5. The method of claim 2, further comprising:
   determining a first set of distances between the third wireless device at the first location and each of the first wireless device, a fourth wireless device, and a fifth wireless device using the FTM procedure;
determining a second set of distances between the third wireless device at a third location and each of the first wireless device, the fourth wireless device, and the fifth wireless device using the FTM procedure;
determining a third set of distances between the third wireless device at a fourth location and each of the first wireless device, the fourth wireless device, and the fifth wireless device using the FTM procedure;
generating first data indicative of a reference region associated with the dwelling based on the first location, the third location, and the fourth location; and
determining the second location of the first wireless device, a fifth location of the third wireless device, and a sixth location of the fourth wireless device within the reference region based on the first set of distances, the second set of distances, and the third set of distances.

6. The method of claim 5, further comprising:
determining a fourth set of distances between a sixth wireless device and each of the first wireless device, the fourth wireless device, and the fifth wireless device;
determining that the sixth wireless device is located within the region based on the fourth set of distances;
receiving, by the first wireless device, second data indicative of an identity of the sixth wireless device;
determining the sixth wireless device is an unknown device based on a comparison between the second data and a list of known devices; and
causing a seventh wireless device to display an indication that the sixth wireless device is located within the reference region.

7. The method of claim 5, further comprising:
determining a fourth set of distances between a sixth wireless device and each of the first wireless device, the fourth wireless device, and the fifth wireless device;
determining a seventh location of the sixth wireless device within the region based on the fourth set of distances;
determining a first connection strength between the first wireless device and the sixth wireless device; and
causing a seventh wireless device to display a visual indication of the first connection strength on a representation of the region.

8. The method of claim 2, further comprising:
identifying, using a motion sensor associated with the first wireless device, an obstruction between the first wireless device and the third wireless device; and
applying a timing measurement correction to the first timing data based on the obstruction.

9. The method of claim 2, wherein the second wireless device operates as an access point (AP) that provides internet access to the first wireless device on the first channel.

10. The method of claim 2, wherein the first FTM process is performed in an operational mode associated with a power save mode.

11. The method of claim 2, wherein the first FTM process is performed in an operational mode associated with one of a soft access point (SoftAP) mode or a target wake time (TWT).

12. The method of claim 2, further comprising:
sending, by the first wireless device to a cloud service, one of the first timing data or the first distance, wherein determining the second location is performed by the cloud service; and receiving, by the first wireless device from the cloud service, data indicative of the second location.

13. The method of claim 4, further comprising:
sending the one of the first timing data or the first distance to a cloud service, wherein determining the first location is performed by the cloud service.

14. A first wireless device comprising:
a first wireless local area network (WLAN) radio, wherein the first wireless device is a part of a WLAN associated with a dwelling; and
a processor coupled to the first WLAN radio, wherein the first wireless device:
establishes a first wireless connection between the first wireless device and a second wireless device;
sends, to the second wireless device, a first indication that the first wireless device is to communicate with a third wireless device, different from the second wireless device, at a first location using a Fine Timing Measurement (FTM) procedure;
determines first timing data comprising a signal round trip time (RTT) associated with a first FTM process, wherein the first FTM process is between the first wireless device and the third wireless device;
determines a first distance between the first wireless device and the third wireless device based on the first timing data; and
determines a second location of the first wireless device within the dwelling using at least the first distance.

15. The first wireless device of claim 14, wherein the first wireless device further:
determines second timing data comprising a signal RTT associated with a second FTM process, wherein the second FTM process is between the first wireless device and a fourth wireless device at a third location;
determines a second distance between the first wireless device and the fourth wireless device based on the second timing data;
determines third timing data comprising a signal RRT associated with a third FTM process, wherein the third FTM process is between the first wireless device and a fifth wireless device at a fourth location;
determines a third distance between the first wireless device and the fifth wireless device based on the third timing data;
generates data indicative of a region associated with the dwelling, wherein generating the data is based on at least the first location, the third location, and the fourth location; and
determines the second location of the first wireless device further using the second distance and the third distance, wherein the second location is within the region.

16. The first wireless device of claim 15, wherein the dwelling has a first floor and a second floor, the first wireless device further:
determines fourth timing data comprising a signal RRT associated with a fourth FTM process, wherein the fourth FTM process is between the first wireless device and a sixth wireless device; and
determines a fourth distance between the first wireless device and the sixth wireless device based on the fourth timing data,
wherein the first location is disposed on the first floor and the fourth location is located on the second floor, and
wherein determining the second location further includes using the fourth distance.

17. The first wireless device of claim 14, wherein the first wireless device further:

identifies, using a motion sensor associated with the first wireless device, an obstruction between the first wireless device and the third wireless device; and applies a timing measurement correction to the first timing data based on the obstruction.

18. The first wireless device of claim 14, wherein the second wireless device operates as an access point (AP) that provides internet to the first wireless device on a first channel.

19. The first wireless device of claim 14, wherein the first FTM process is performed in an operational mode associated with a power save mode.

20. The first wireless device of claim 14, wherein the first FTM process is performed in an operational mode associated with a soft access point (SoftAP) mode or a target wake time (TWT).

* * * * *